United States Patent
Bashkansky et al.

(10) Patent No.: US 12,260,518 B2
(45) Date of Patent: Mar. 25, 2025

(54) SINGLE-PIXEL IMAGING THROUGH DYNAMIC SCATTERING MEDIA

(71) Applicant: The Government of the United States of America, as represented by the Secretary of the Navy, Arlington, VA (US)

(72) Inventors: Mark Bashkansky, Alexandria, VA (US); Samuel Park, McLean, VA (US); John F. Reintjes, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 444 days.

(21) Appl. No.: 17/691,172

(22) Filed: Mar. 10, 2022

(65) Prior Publication Data

US 2022/0375034 A1    Nov. 24, 2022

Related U.S. Application Data (60) Provisional application No. 63/185,509, filed on May 7, 2021.

(51) Int. Cl.
*G06T 5/00* (2024.01)
*G06T 5/10* (2006.01)

(52) U.S. Cl.
CPC .  *G06T 5/00* (2013.01); *G06T 5/10* (2013.01)

(58) Field of Classification Search
CPC .... G06T 5/00; G06T 5/10; G06T 5/70; G06T 2207/10152
See application file for complete search history.

(56) References Cited

U.S. PATENT DOCUMENTS

| 4,920,412 A | 4/1990 | Gerdt et al. |
| 8,199,244 B2 * | 6/2012 | Baraniuk ................ H04N 3/08 |
| | | 348/335 |

(Continued)

OTHER PUBLICATIONS

W. Zhang et al., "Digital filtering ghost imaging to remove light disturbances," Appl. Opt. 60, 809 (2021).

(Continued)

*Primary Examiner* — Solomon G Bezuayehu
(74) *Attorney, Agent, or Firm* — US Naval Research Laboratory; Scott C. Hatfield (57) ABSTRACT

A method for using a single-pixel camera to reconstruct images of objects obscured by fog or other dynamic scattering media. A pseudo-random phase or intensity pattern is imposed on illumination beams directed at a target. The beam with the imposed pattern forms a pseudo random pattern on the target. Information regarding the pattern imposed on each pulse is entered into a data processor/controller. The illumination beams with the pseudo random patterns are reflected off the target, collected by receiving optics and a bucket detector and converted into electronic signals fed into the data processor/controller. The data processor/controller applies a high-pass filter to remove slower signal variations produced by dynamic changes in the scattering medium over time. The filtered bucket values are then used together with their corresponding speckle patterns to generate the images using any appropriate reconstruction algorithm such as CGI or CSI.

9 Claims, 9 Drawing Sheets

(56) References Cited

U.S. PATENT DOCUMENTS

| | | | |
|---|---|---|---|
| 9,197,789 | B2 | 11/2015 | Mukhopadhyay et al. |
| 9,538,113 | B2 | 1/2017 | Grauer |
| 10,752,158 | B2 | 8/2020 | Satat et al. |
| 10,802,066 | B1* | 10/2020 | Keaveney ............... G01R 29/10 |
| 11,226,293 | B1* | 1/2022 | Feng .................... G01N 21/958 |
| 2010/0040300 | A1 | 2/2010 | Kang et al. |
| 2011/0025870 | A1 | 2/2011 | Baraniuk et al. |
| 2012/0038789 | A1 | 2/2012 | Kelly et al. |
| 2014/0177960 | A1 | 6/2014 | Park et al. |
| 2014/0205192 | A1 | 7/2014 | Wang |
| 2014/0267881 | A1 | 9/2014 | Bernal et al. |
| 2018/0032896 | A1* | 2/2018 | Fleischer ................. G06E 1/04 |
| 2018/0177401 | A1* | 6/2018 | Yang ................. G01N 21/6458 |
| 2018/0373009 | A1* | 12/2018 | Yuste ..................... G02B 21/06 |
| 2020/0370959 | A1* | 11/2020 | Lombez ............. G01N 21/6408 |
| 2021/0021799 | A1* | 1/2021 | Bian .................. G01B 11/2527 |

OTHER PUBLICATIONS

L. Li et al., "Gated viewing laser imaging with compressive sensing," Appl. Opt. 51, 2706-2712 (2012).

N. D. Hardy et al., "Computational ghost imaging versus imaging laser radar for three dimensional imaging," Phys. Rev. A 87, 023820 (2013).

M. J. Sun, et al., "Single pixel three dimensional imaging with time based depth resolution," Nat. Commun. 7, 12010 (2016).

Y. Zhu, et al., "Photon limited non imaging object detection and classification based on single pixel imaging system," Appl. Phys. B 126, 21 (2020).

D. Hardy et al., "Reflective ghost imaging through turbulence," Phys. Rev. A 84, 063824 (2011).

M. A. Cox, et al., "Structured Light in Turbulence," IEEE J. Sel. Top. Quantum Electron. 27, 1-21 (2021).

B. I. Erkmen, "Computational ghost imaging for remote sensing," J. Opt. Soc. Am. A 29, 782 (2012).

T. Shirai, et al., "Imaging through an aberrating medium with classical ghost diffraction," J. Opt. Soc. Am. A 29, 1288 (2012).

Y. P. Yao, et al., "Effect of turbulence on visibility and signal to noise ratio of lensless ghost imaging with thermal light," Optik 124, 6973-6977 (2013).

A. Liutkus, et al., "Imaging With Nature: Compressive Imaging Using a Multiply Scattering Medium," Sci. Rep. 4, 5552 (2015).

V. Durán, et al., "Compressive imaging in scattering media," Opt. Express 23, 14424 (2015).

B. Rajaei, et al., "Intensity only optical compressive imaging using a multiply scattering material and a double phase retrieval approach," in 2016 IEEE International Conference on Acoustics, Speech and Signal Processing (ICASSP), (IEEE, Shanghai, 2016), pp. 4054-4058.

O. Katz, et al., "Compressive ghost imaging," Appl. Phys. Lett. 95, 131110 (2009).

F. Ferri, et al., "Differential Ghost Imaging," Phys. Rev. Lett. 104, 253603 (2010).

C. Li, et al., "An efficient augmented Lagrangian method with applications to total variation minimization," Comput. Optim. Appl. 56, 507-530 (2013).

K. Pearson, "Mathematical contributions to the theory of evolution-iii. regression, heredity, and panmixia," Philos. Transactions Royal Soc. London. Ser. A, containing papers a mathematical or physical character pp. 253-318 (1896).

J. Taylor, Introduction to error analysis, the study of uncertainties in physical measurements (University Science Books, 1997), 2nd ed., pp. XXX [Need Specific Pages].

P. S. Lebow et al., "Gated holographic imaging for structured illumination through obscurations," Opt. Lett. 42, 2543 (2017).

David B. Lindell et al., "Three-dimensional imaging through scattering media based on confocal diffuse tomography," Nature Communications 11(1):4517 (2020).

George. J. Yates et al., "Range-gated imaging for near-field target identification,", Proc. SPIE 2869, 22nd International Congress on High-Speed Photography and Photonics, (May 28, 1997).

ChingSeong Tan et al., "A novel application of range-gated underwater laser imaging system (ULIS) in near-target turbid medium," Optics and Lasers in Engineering, vol. 43, Issue 9, 2005, pp. 995-1009.

Kanaev, A. V., et al., "Imaging through extreme scattering in extended dynamic media," Optics Letters, vol. 43, No. 13, pp. 3088-3091, Jun. 21, 2018.

Park, S. D., et al., "Singular value decomposition approach to coherent averaging in digital holography," J. Opt. Soc. Am. A, vol. 37, No. 8, pp. 1276-1281, Jul. 23, 2020.

\* cited by examiner

FIG. 8A  FIG. 8B  FIG. 8C  CGI

FIG. 8D  FIG. 8E  FIG. 8F  CSI

SINGLE-PIXEL IMAGING THROUGH DYNAMIC SCATTERING MEDIA

CROSS-REFERENCE

This application is a Nonprovisional of and claims the benefit of priority under 35 U.S.C. § 119 based on U.S. Provisional Patent Application No. 63/185,509 filed on May 7, 2021. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #210196.

TECHNICAL FIELD

The present invention relates to the field of digital imaging.

BACKGROUND

Digital images are an increasingly important aspect of modern life. They are a key component of systems for autonomous vehicles, machine vision, and artificial intelligence, among others, or simply for storage of historical records.

Charge Coupled Device (CCD) and Complementary Metal Oxide Semiconductor (CMOS) cameras are commonly used to produce such digital images. These are multi-pixel devices that may not be the best choice for some applications due to their limited sensitivity in a region of the optical spectrum of interest or price. For this reason, imaging with structured light beams using single-pixel cameras (SPCs) that use a single bucket detector has attracted considerable attention in recent years. SPCs use small variations of the detected light that are correlated with various illumination patterns to reconstruct a two-dimensional image using various numeric algorithms. However, this reconstruction can fail if there is extraneous variation of the detected light due to a dynamic environment, such as smoke, fog or scattering by particles in water.

Ghost imaging and compressive imaging approaches have been implemented to successfully acquire images under various conditions. A high-pass digital filter has been used in some cases to reduce the effects of background light disturbances in ghost imaging. See W. Zhang et al., "Digital filtering ghost imaging to remove light disturbances," *Appl. Opt.* 60, 809 (2021). One approach that has been used to reduce these background light disturbances is 3-D imaging. See L. Li et al., "Gated viewing laser imaging with compressive sensing," *Appl. Opt.* 51, 2706-2712 (2012); N. D. Hardy et al., "Computational ghost imaging versus imaging laser radar for three-dimensional imaging," *Phys. Rev. A* 87, 023820 (2013); and M.-J. Sun, et al., "Single-pixel three-dimensional imaging with time-based depth resolution," *Nat. Commun.* 7, 12010 (2016).

Another imaging technique that has been used recently is that of single photon imaging. See Y. Zhu, et al., "Photon-limited non-imaging object detection and classification based on single-pixel imaging system," *Appl. Phys. B* 126, 21 (2020)). Single photon imaging utilizes detectors that are capable of responding to light at the quantum limit of one photon at a time. It allows acquisition of images under low light conditions which is desirable for delicate samples, long distance or covert imaging.

In many cases, the object to be imaged is situated within a turbulent medium, or a turbulent medium is situated between the target object and the remote imaging equipment, and techniques have been developed to address the issues related to imaging in such turbulent media. See D. Hardy et al., "Reflective ghost imaging through turbulence," *Phys. Rev. A* 84, 063824 (2011); M. A. Cox, et al., "Structured Light in Turbulence," *IEEE J. Sel. Top. Quantum Electron.* 27, 1-21 (2021)); B. I. Erkmen, "Computational ghost imaging for remote sensing," *J. Opt. Soc. Am. A* 29, 782 (2012); T. Shirai, et al., "Imaging through an aberrating medium with classical ghost diffraction," *J. Opt. Soc. Am. A* 29, 1288 (2012); and Y.-P. Yao, et al., "Effect of turbulence on visibility and signal-to-noise ratio of lensless ghost imaging with thermal light," *Optik* 124, 6973-6977 (2013).

The major issue with imaging through a dynamic scattering medium such as fog is attenuation due to scattering, which presents problems for all imaging systems. See A. Liutkus, et al., "Imaging With Nature: Compressive Imaging Using a Multiply Scattering Medium," *Sci. Rep.* 4, 5552 (2015); V. Duran, et al., "Compressive imaging in scattering media," *Opt. Express* 23, 14424 (2015); and B. Rajaei, et al., "Intensity-only optical compressive imaging using a multiply scattering material and a double phase retrieval approach," in 2016 *IEEE International Conference on Acoustics, Speech and Signal Processing (ICASSP)*, (IEEE, Shanghai, 2016), pp. 4054-4058.

In this regard, single-pixel imaging systems have a potential advantage because they focus all of the available photons onto a single detector, increasing the signal to noise ratio (SNR).

However, there are additional problems in imaging through fog even without turbulence, which is usually responsible for image degradation over long distances.

One prominent issue is the temporal variation of the detected signal due to unavoidable changes in the fog density with time. These changes can be confused with temporal variations in the detected signal associated with changes in the target reflectivity as the structure on the illumination beam is varied, thus reducing the fidelity of the reconstructed image.

Another issue is the presence of light scattered by the fog itself. Such scattered light can mask the image, add its own dynamic and shot noise and can also saturate the detector.

One established technique to address the issues in imaging through fog uses time-gated two-dimensional cameras. See George. J. Yates et al., "Range-gated imaging for near-field target identification,", *Proc. SPIE* 2869, *22nd International Congress on High-Speed Photography and Photonics*, (28 May 1997); and ChingSeong Tan et al., "A novel application of range-gated underwater laser imaging system (ULIS) in near-target turbid medium," *Optics and Lasers in Engineering, Volume* 43, Issue 9, 2005, Pages 995-1009. Another technique uses time-gated holographic techniques, again requiring two-dimensional detectors. See P. S. Lebow et al., "Gated holographic imaging for structured illumination through obscurations," *Opt. Lett.* 42, 2543 (2017). A third technique uses a single-pixel detector with raster scanning. See David B. Lindell et al., "Three-dimensional imaging through scattering media based on confocal diffuse tomography," *Nature Communications* 11(1):4517 (2020).

However, all of these conventional techniques suffer drawbacks that can make their use less than optimal. Two dimensional time gated cameras are expensive and only work in limited wavelength regions. Raster scanning requires collection of as many signal values as there are resolution elements. Signal acquisition times can become quite long for imaging through longer distances. In addition, signal strength can change during the acquisition process due to time dependent absorption or scattering which will degrade the reconstructed image.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method for using a single-pixel camera or detector to reconstruct images of objects obscured by fog or other media which reduces transmission and/or scatters light in a time-dependent manner. It is based on the observation that the time scale of the intensity variations of the gated detector due to changes in fog density is much slower than the time scale for the variations due to changes in the structured beam illumination. As a result, it becomes possible to suppress the effects of fog density variations by using a combination of short pulses, a fast detector and a high-pass filter in the detection system.

In an exemplary embodiment, a pseudo-random pattern, which can be predefined or defined as generated, is imposed on each of a series of fast-pulse illumination beams directed at a target object to be imaged, where the illumination beam with the imposed pattern forms a speckle pattern on the target object which is updated at a rapid rate, e.g., 40 Hz. Images of the speckle patterns at the target can be prerecorded with a camera for each pulse and entered into a data processor/controller. For longer ranges the speckle patterns for each pulse can also be calculated numerically and entered into the data processor/controller. The energy in each pulse, used for normalization of laser shot-to-shot fluctuations, is also entered into a data processor/controller via a reference detector before the illumination beam strikes the target. The illumination beams with the speckle patterns are reflected off the target, received by collecting optics that focus the returned light onto a bucket detector that converts the light into electronic signals that are input into the data processor/controller. The data processor/controller applies a high-pass filter to remove slower signal variations produced by dynamic changes in the scattering medium over time. The filtered bucket-detector values are then used together with their corresponding speckle patterns and normalization data to generate the images using any appropriate reconstruction algorithm such as computational ghost imaging (CGI) or compressive sensing imaging (CSI).

Using the techniques in accordance with the present invention, an image of the target can be successfully reconstructed in the presence of fog or other dynamic scattering media using both CGI and CSI, which has the potential for shorter acquisition times.

BRIEF DESCRIPTION OF THE DRAWINGS

FIGS. 3A-3C are reconstructed using CGI and FIGS. 3D-3F are reconstructed using CSI.

FIGS. 4A-4C are images of a target object, where

FIGS. 8A-8C are CGI reconstructed images and FIGS. 8D-8F are CSI reconstructed images.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the present invention is often described below in the context of imaging through fog, one skilled in the art will readily understand that the present invention can be applied to imaging through other dynamic scattering media such as water, rain, or aerosols, which can reduce transmission and/or scatter light in a time-dependent manner.

As noted above, imaging an object through fog presents significant difficulties, even without turbulence in the fog, with the fog often being responsible for image degradation over long distances. The present invention provides a method that uses a single-pixel camera or detector to reconstruct images of objects obscured by fog.

One prominent issue with imaging through fog using single-pixel cameras (SPCs) is the temporal variation of the detected signal that occurs due to unavoidable changes in the fog density with time. These changes can be confused with temporal variations in the detected signal associated with changes in the target reflectivity as the structure on the illumination beam is varied, thus reducing the fidelity of the reconstructed image. Another issue is the presence of light scattered by the fog itself, which can saturate the detector or add dynamic and shot noise.

The present invention provides a method for imaging objects through a dynamic scattering medium such as fog that mitigates the effects of temporal variations of the signal due to variation in the medium, e.g., fog density. It is based on the observation that the time scale of the intensity variations of the gated detector due to changes in fog density is much slower than the time scale for the variations due to changes in the structured beam illumination. As a result, the effects of fog density variations can be suppressed by using a combination of fast pulses, a fast detector and a high-pass filter in the detection system. As described in more detail below, the method of the present invention has been used to successfully reconstruct an image of the target in the presence of fog using both computational ghost imaging and compressive sensing which has the potential for shorter acquisition times.

The imaging technique in accordance with the present invention uses high-pass filters similar to the technique described in Zhang et al., supra. However, in Zhang et al., the source of the background fluctuations was external to the illumination system and can be mitigated by other means, such as optical narrowband filtering or use of a reference detector. In contrast, the temporal fluctuations in our application are introduced directly onto the returned signal, making it impossible to compensate for them with a simple reference detector.

As described in more detail below, the present invention provides an apparatus setup and a technique for mitigating the temporal variations of the signals received by a time-gated detector due to variation in the fog density. The imaging technique in accordance with the present invention is based on the observation that the time scale of the intensity variations of the signals due to changes in fog density is much slower than the time scale for the variations due to changes in the structured beam illumination. As a result, it becomes possible to suppress the effects of fog density variations by using short pulses, a fast detector and a high-pass filter in the detection system. Using this technique, we have demonstrated that the image of the target can be successfully reconstructed in the presence of fog using both computational ghost imaging and compressive sensing, which has the potential for shorter acquisition times.

Figure 1:
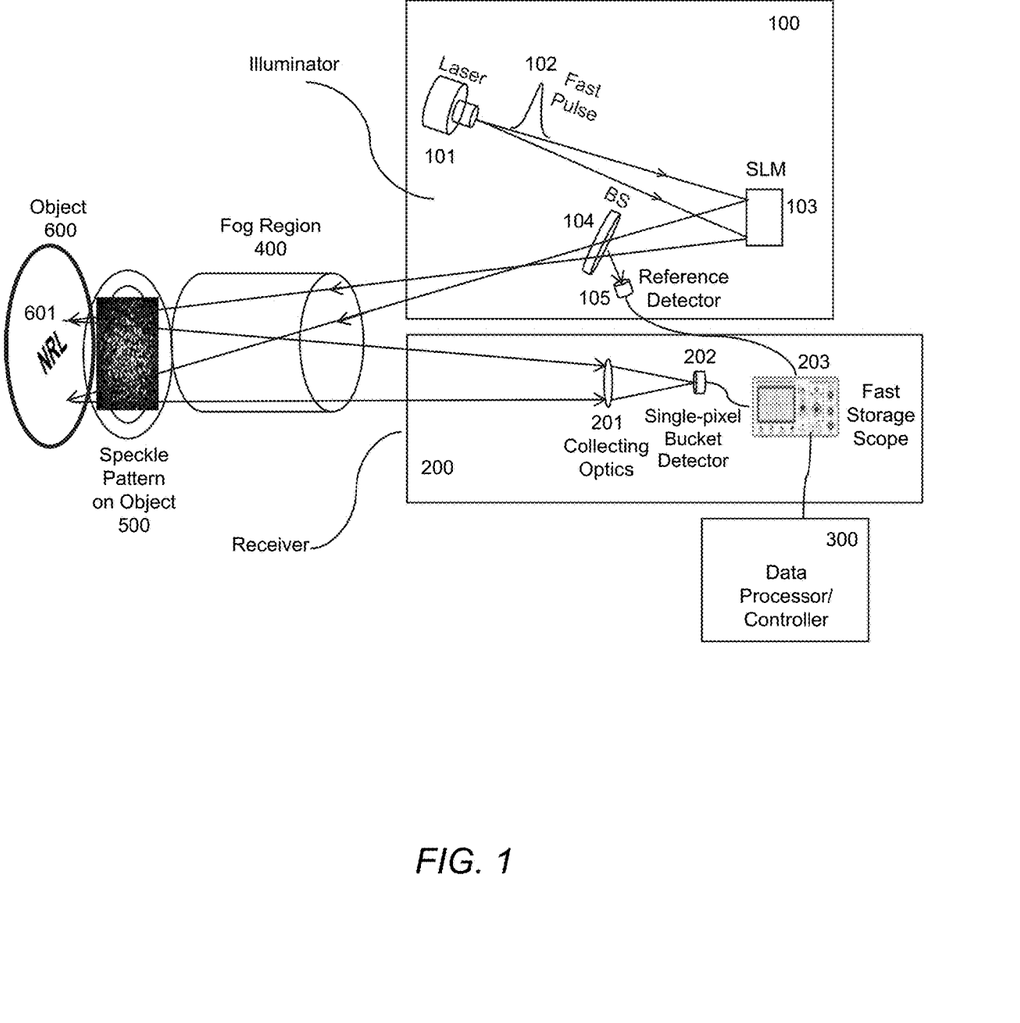
FIG. 1 is a block schematic illustrating aspects of an exemplary apparatus for single-pixel imaging through fog in accordance with the present disclosure.

The block schematic in FIG. 1 illustrates an exemplary apparatus setup and aspects of the method for single-pixel imaging in accordance with the present invention.

As shown in FIG. 1, an exemplary apparatus setup in accordance with the present invention can include an illuminator 100, a receiver 200 and a data processor/controller 300. The illuminator can include a pulsed laser source 101, a spatial light modulator (SLM) 103, a beam splitter 104 and a reference detector 105. The receiver can include a collecting optic system 201 (shown here as a simple lens), a fast "bucket" (non-imaging) detector 202 and a fast storage scope 203. Data processor/controller 300 can include a computer programmed with appropriate software and having sufficient bandwidth and memory to control the apparatus described herein; process and analyze the data, including applying a high-pass filter as described below; and implement the algorithms necessary to reconstruct the image.

In accordance with the present invention and with reference to the exemplary apparatus illustrated in FIG. 1 a fast pulse illumination signal 102 is formed by a pulsed laser 101. Laser 101 can be any suitable pulsed laser source that produces pulses typically from less than one nanosecond to a few nanoseconds in duration. For example, one exemplary laser system that can be used for imaging through fog is Bright Solutions SRL wedge XF 532 that produces 10 µJ 532-nm sub-nanosecond pulses at a repetition rate of 10 kHz.

The range of laser parameters such as pulse duration, pulse energy and repetition rate and the frame rate of the SLM are driven by a combination of the system requirements and the limits of the various technological capabilities. In general, the system requirement is for acquisition of an image with a specified minimum spatial resolution and field of view (FOV), which can give the number of resolution elements in the image. These parameters affect the number of elements in the SLM, with more elements allowing sharper image resolution or larger FOV. SLM's with 1920×1200 elements are generally applicable to a wide range of applications.

The laser pulse duration is affected by the requirement for sufficient range resolution and the ability to suppress scattering from regions of the perturbing medium or other potential targets located at distances that are different from the distance of the desired target. Generally, pulse durations ranging from sub nanoseconds to a few nanoseconds (2-15 nsec) are sufficient for most applications.

The SLM framing rate determines the time required for image acquisition, and higher rates allow faster acquisition times. In addition, the SLM framing rate should be faster than the time scale of the dynamic fluctuations of the scattering medium with the upper limit would generally be set by available technology. Depending on the dynamics of the scattering medium, SLM framing rates can vary from tens of Hz to tens of kHz. Phase SLM's can have frame rates up to 40 Hz, while DMD SLM's can have rates up to 40 kHz.

The laser pulse repetition rate can be matched to the SLM framing rate or can be higher to allow averaging of multiple laser pulses for a given spatial pattern. Higher SLM framing rates, along with higher laser repetition rates allow faster image acquisition times.

The pulse energy of the laser is determined by the requirement of having sufficient received energy to be detected by the bucket detector in a single pulse. Higher pulse energies generally allow imaging at longer distances or through a denser scattering medium. However, higher pulse energies at a given pulse repetition rate lead to a higher average power requirement for the laser, which is usually limited by available laser power. Pulse energies of the order of 10 µJ can be sufficient, with higher energies allowing faster acquisition times or longer ranges.

The range of laser wavelengths is determined by the needs of the specific application, along with the availability of lasers with the combination of parameters as discussed above. For example, imaging through water would generally require laser wavelengths in the blue green region of the spectrum because of the spectral absorption of water. Imaging through air can accommodate longer wavelengths, ranging from the visible into the infrared (0.5 μm up to 1.5 μm or longer). Longer wavelengths are associated with less scattering in the medium, allowing longer ranges. However, a lack of availability of suitable detectors at the longer wavelengths can limit the wavelength extent in the infrared.

The illumination beam produced by fast pulse 102 is directed into a spatial light modulator (SLM) 103 which imposes a pseudo-random pattern on the illumination beam. In some embodiments, SLM 103 can be a phase SLM that produces random phase patterns on the illumination beam, while in other embodiments, such as described below with respect to FIG. 9 and FIG. 10, it can be a digital micromirror device (DMD) with an imaging lens that produces intensity patterns in the beams. In some embodiments, the patterns imposed on the beam by SLM 103 can be generated during the imaging process, while in other embodiments, the patterns can be pre-calculated, stored in data processor 300, and then transferred into memory in SLM 103 for faster operation.

Beam splitter 104 directs a portion of the illumination light onto a reference detector 105. Reference detector 105 defines the initial time 0 and therefore the distance for pulses that can fluctuate in time. For lasers that have a very stable pulse generation time with provided trigger signals or ones that can be externally triggered, time 0 can come from that trigger. The time from the trigger to the chosen digital time gate can be converted to distance.

The signal from reference detector 105 is then fed into fast storage scope 203 in order to normalize laser pulse to pulse energy fluctuations and to trigger the scope, setting the zero reference time for subsequent selection of target ranges. The illumination beam then propagates through the scattering medium such as fog region 400 towards a target object 600 to be imaged, with the imposed pseudo-random phase pattern produced by SLM 103 causing the illumination beam to develop a speckled intensity distribution such as speckle pattern 500 in illuminated area 600 as it hits the target object 601. In accordance with the present invention, the patterns imposed on illumination beam by SLM 103 and the corresponding speckle patterns on the target are updated at a rate of, e.g., 40 Hz commensurate with the considerations given earlier.

The illumination beam with the speckle pattern is then reflected off target 601, propagates back through fog region 400, and is focused by collecting optics 201 onto a fast single-pixel "bucket" detector 202. Collecting optics 201 can include any suitable components, such as a single lens or mirror or a system containing multiple lenses or mirrors or a combination of both mirrors and lenses, that can focus the light onto the bucket detector. Bucket detector 202 then converts the detected photons from the reflected beams into an electrical signal that is recorded on a fast storage scope 203.

Fast storage scope 203 is triggered by a reference detector and stores a time trace of the detected signal for each speckle pattern. The stored time traces are digitally gated to record a single value for each trace at a particular time corresponding to the distance of the object of interest from the reference detector and discarding the signals due to the fog or other potential targets that are located at different distances and hence occur at different times. Since the speckle patterns are produced sequentially in time, the gated bucket signals then are correspondingly stored as a time sequence.

Fast storage scope 203 also receives and digitizes the signal from reference detector 105. The digital data from both bucket detector 202 and reference detector 105 can then be input directly into a data processor such as data processor/controller 300 coupled to the signal receiving apparatus or can be input into a data storage device which can then be used to input the signal data into data processor/controller 300. In either case, the digital signals are passed to data processor/controller 300 for analysis, where the data processor normalizes the digital signal from bucket detector 202 according to the signal from the reference detector 105 and applies a digital high-pass filter to remove the slower signal variations produced by dynamic changes in fog density over time. The filtered bucket values are then used together with their corresponding speckle patterns to generate the images using any appropriate reconstruction algorithm such as CGI or CSI.

EXAMPLE

In experiments to demonstrate the efficacy and utility of the present invention, the inventors at the Naval Research Laboratory (NRL) used as the target 601 a cutout of the letters "NRL" on white paper, placed just outside a 4-foot-long fog chamber forming a fog region 400. In these experiments the fog chamber was in the form of an 8×10× 48-inch oblong chamber fabricated using Lexan® polycarbonate sheets, Anti-reflective coated optical windows were used to control the beam path and minimize optical loss as the light travels through the chamber. The fog was generated by a cyclone ultrasonic fogger, with a ball valve being used to regulate the rate of introduction of the fog. The fog entered the chamber through holes equidistantly spaced in a polyvinyl chloride (PVC) pipe extending the length of the fog chamber. This technique results in an approximately uniform fog distribution throughout the entire chamber.

A Thorlabs® DET10A2 bucket detector was used to collect backscattered light from the target, while a PicoScope® 6407 Digitizer was used to collect the multiple traces from the bucket detector. Gated values of each trace, corresponding to the distance to the object, were used together with the stored speckle patterns for reconstruction of the image (NRL) with computational ghost imaging (CGI) and compressive sensing imaging (CSI).

One hundred (100) laser shots were averaged for each speckle pattern on the target to further reduce laser fluctuations. The double pass transmission of light in the fog was exp(−6), measured using a separate 532 nm continuous wave (CW) laser propagating through the fog chamber (not shown in figure). Higher attenuations could be used in principle, but under those conditions the fog scatter near the target exceeded the dynamic range of our digital oscilloscope.

Figure 2:
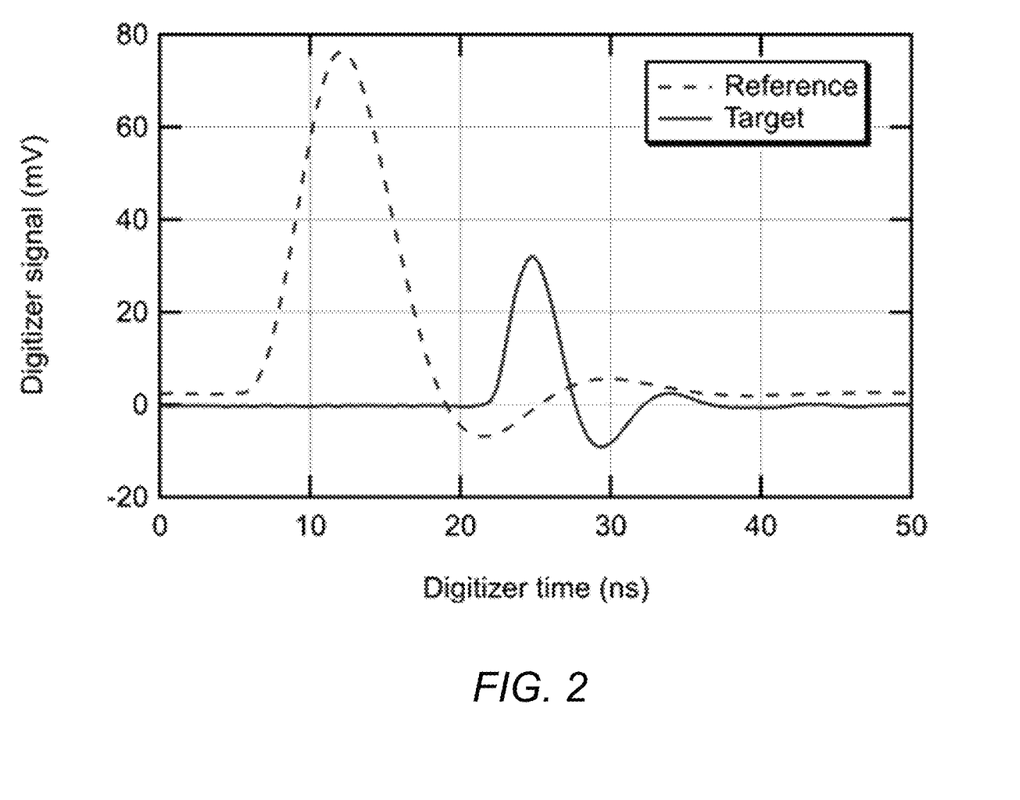
FIG. 2 is a plot of a detected bucket signal as a function of time without fog.

An example of a typical time signal obtained without fog (solid curve) along with a reference signal (dashed curve) for normalization and range is shown in FIG. 2. The recorded reference signal is used to normalize the pulse to pulse laser fluctuations that are present in all lasers and can negatively impact image reconstruction. Collecting the full trace enables the ability to differentiate and reconstruct multiple targets located at different distances, providing a potential of three-dimensional scene reconstruction.

The image is reconstructed using the SLM and a single-pixel (bucket) detector. The SLM is used to project unique 2D intensity patterns $I_i(x, y)$ onto the object and the reflection intensity is measured using a single-pixel detector by means of the relation $$b_i = \iint I_i(x,y) O(x,y) dx dy \qquad (1)$$

where $b_i$ is the peak of the ith integrated time signal and O(x,y) is the reflection function of the object/target. Provided that the bucket detector is collecting the scattered light from the object illuminated by the 2D intensity pattern, $b_i$ is effectively a time-gated weighting factor for each unique intensity pattern in the image reconstruction algorithm.

To reconstruct the object's reflection function using CGI, the 2D intensity patterns are weighted with the bucket detector measurements, as described in O. Katz, et al., "Compressive ghost imaging," Appl. Phys. Lett. 95, 131110 (2009), i.e., $$O(x,y) = \langle (b_i - \langle b \rangle) I_i(x,y) \rangle \tag{2}$$

where $\langle \cdot \rangle = 1/M \, \Sigma \cdot$ denotes an ensemble average over all the measurements M received by the bucket detector.

An alternative algorithm that uses a reference detector signal has also been employed for an improvement in the image reconstruction, as described in F. Ferri, et al., "Differential Ghost Imaging," Phys. Rev. Lett. 104, 253603 (2010), i.e., $$O_{CGI}(x,y) = \langle (b_i - \langle b \rangle / \langle r \rangle r_i)(I_i(x,y) - \langle I(x,y) \rangle) \rangle \tag{3}$$

where $r_i$ is the reference detector measurement.

For analysis using compressive sensing image reconstruction (CSI), TVAL3, a total variation (TV) minimization solver is often used because of its speed and robustness in the presence of noise, though any suitable minimization solver can be used as appropriate. See C. Li, et al., "An efficient augmented Lagrangian method with applications to total variation minimization," Comput. Optim. Appl. 56, 507-530 (2013).

Such CSI reconstruction is performed by solving for the object image using the model $$\min_{O_{CSI}} \sum_i \|D_i O_{CSI}\| + \frac{\mu}{2} \|A O_{CSI} - b\|_2^2 \tag{4}$$

where $D_i O_{CSI}$ is the discrete gradient, or total variation, of the reconstructed image $O_{CSI}$ at pixel i, A is the measurement matrix (speckle realizations), and b is the compressed signal, or bucket, value. The parameter $\mu$ is the penalty parameter that is adjusted to compensate for the noise in the bucket values and the sparsity level of the reconstructed image $O_{CSI}$.

Figure 3A:
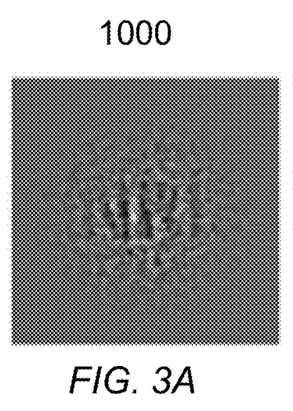
FIGS. 3A-3F are reconstructed images of a target taken without fog but with varying number of speckle pattern measurements, where
Figure 3B:
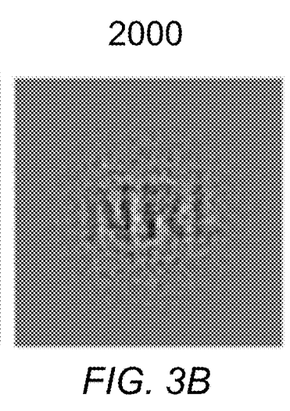
Figure 3C:
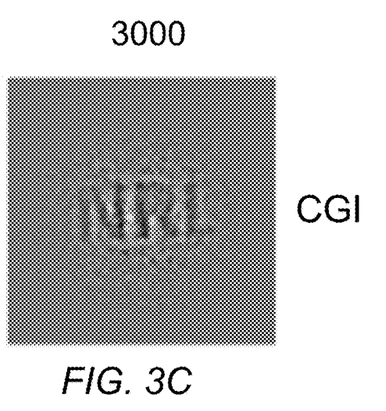
Figure 3D:
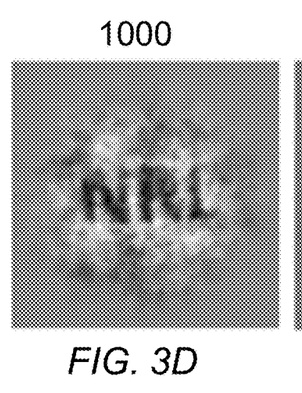
Figure 3E:
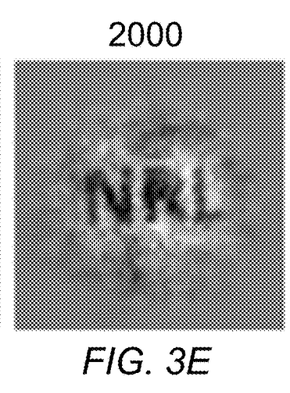
Figure 3F:
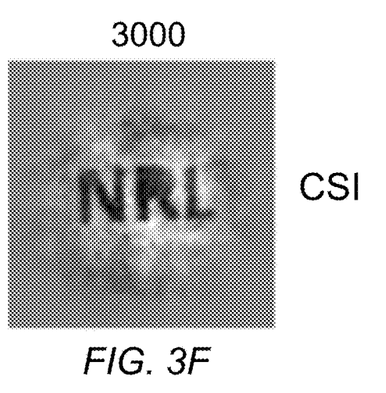

A comparison of image reconstruction using CGI vs. CSI is shown by the images in FIGS. 3A-3F, where FIGS. 3A-3C are images reconstructed using CGI with 1000, 2000, and 3000 speckle patterns, respectively, and FIGS. 3D-3F were reconstructed from the same number of speckle patterns using CSI. Both techniques are able to resolve the NRL target, but the CSI reconstruction using TVAL3 shows an improvement in contrast while preserving the edges of the image. It is worth noting that the image can be adequately reconstructed with CSI using fewer speckle realizations, providing the potential for faster data acquisition at the expense of computation time.

Measurements with Fog

Figure 4A:
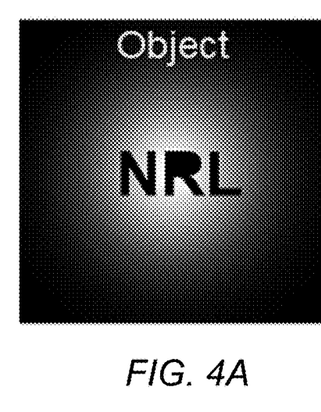
FIG. 4A is a two-dimensional (2D) camera image of the object.
Figure 4B:
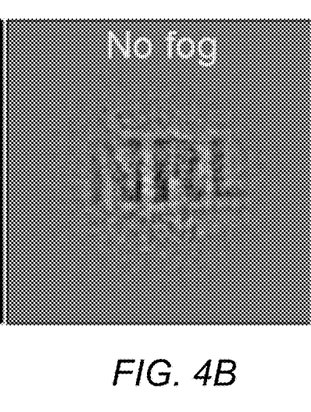
FIG. 4B is a CGI reconstruction of the image without fog and FIG. 4C is a CGI reconstruction of the image with fog using conventional reconstruction techniques.
Figure 4C:
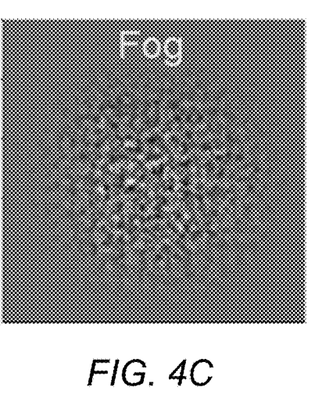

The images in FIGS. 4A-4C show the results of CGI image reconstruction of the target object (FIG. 4A) obtained by means of Equation (3) using 4000 speckle patterns. FIG. 4B shows a reconstruction of the image in a fog-free environment; although the target is not completely resolved, the NRL letters are distinguishable. However, as can be seen from FIG. 4C, reconstruction of the image through fog using the same approach fails, with the image being totally blurred. This demonstrates that conventional reconstruction techniques fail in presence of fog and that the modified new approach in accordance with the present invention therefore is needed.

A potential source of the failed reconstruction is the additional temporal fluctuations in the bucket signal introduced by the fog that are not associated with the changing SLM patterns. The time-varying signal for CW laser light transmitted through the fog chamber is shown as solid curve in FIG. 5 along with the bucket detector measurements used without fog, shown in FIG. 5 by the pattern of circles.

It can be seen that the transmitted laser intensity displays peak-to-peak variations of up to 30%. This does not present significant issues for single-shot or multi-shot focal plane array detectors. However, structured light imaging relies on small changes in the detected light for multiple single detector exposures. These desired fluctuations are comparatively small, on the order of 1%. The ability to reconstruct an image using structured light will be severely degraded by any noise added to the bucket detector measurements. It can be expected that the additional noise fluctuations due to fog shown in FIG. 5 will render reconstruction impossible with the usual techniques.

Figure 5:
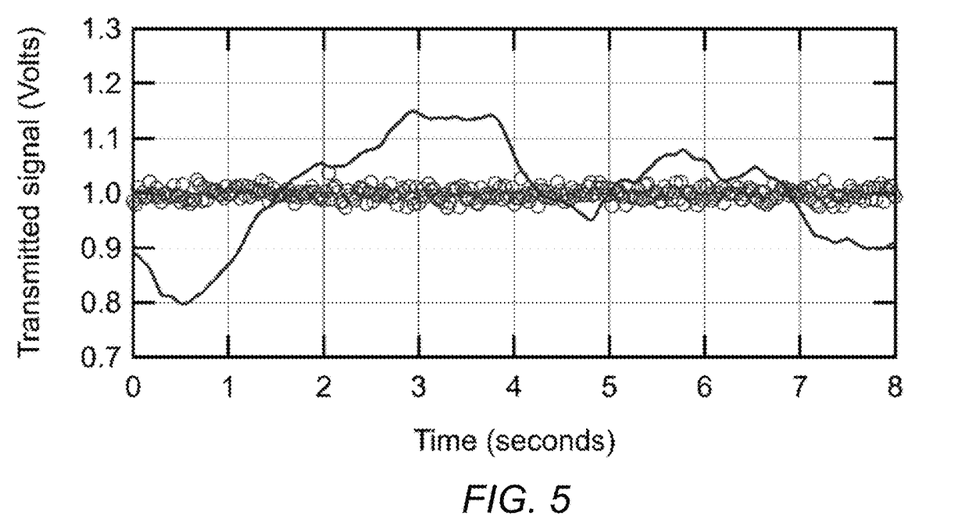
FIG. 5 is a plot of an exemplary time-varying transmission of light through a fog region, where the solid line represents transmission of continuous wave light and the circles represent pulsed bucket detector measurements used in structured light reconstruction without fog.
Figure 6:
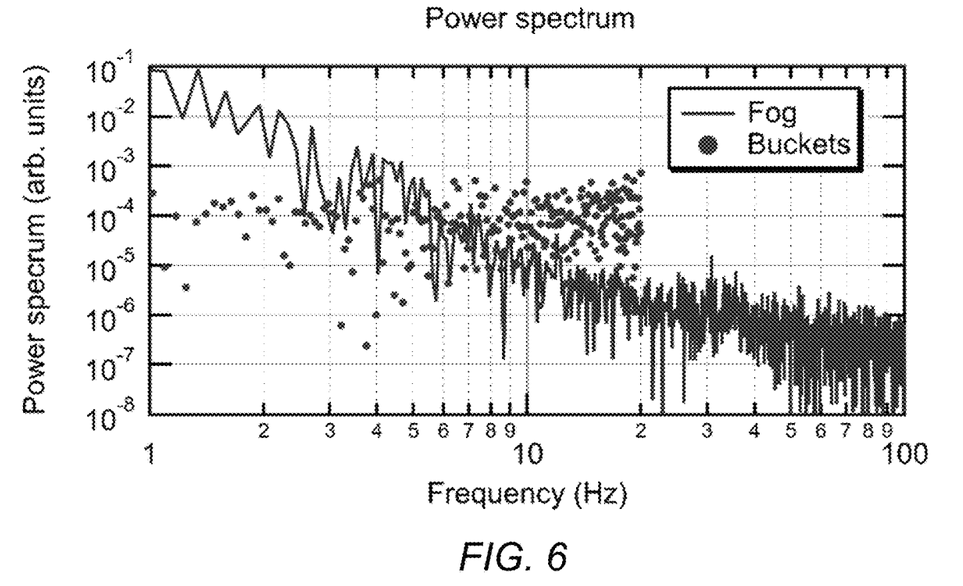
FIG. 6 is a plot of a power spectrum of an exemplary transmission of light through a fog region (solid line) and power spectrum of bucket detector measurements without fog (dots).

However, it is also evident from FIG. 5 that the fog-induced power fluctuations occur on a significantly slower time scale than the variations associated with the changing speckle patterns. This is confirmed by examining the power spectrum of the signals as shown in FIG. 6.

The bucket detector measurements were taken at 40 Hz, with a Nyquist frequency of 20 Hz. As can be seen in FIG. 6, most of the fog noise appears below ~6 Hz. It can be expected that high-pass filtering of the bucket signal through the fog will remove most of the noise and only some of the needed bucket fluctuations, enabling reconstruction of the structured light even in the presence of fog. A successful demonstration of this technique is given in the next section. A similar situation was described in Zhang et al., supra, where slow fluctuations in the background intensity were shown to degrade the image reconstruction. As mentioned earlier, a high-pass filter was used in Zhang et al. to retrieve the reconstructed image. However, as also mentioned earlier, the fluctuations in our systems arise from variation in the transmission of the signal through the fog, not as fluctuations in background light that are not associated with the signal.

Mitigation of Fog Fluctuations

As noted above, to eliminate fog induced fluctuations, the method of the present invention uses a digital high-pass filter on the bucket signals processed by the data processor/controller. The computational nature of both CGI and CSI allows the use of different filters on the same data set, since the bucket values for imaging with and without fog are stored in a data processor such as data processor/controller 300 together with the corresponding speckle patterns. We can compare the high-pass filtered bucket values with fog to those measured without fog to determine how well this technique works. Of course this approach cannot yield a reconstruction completely identical to the one without fog since some functional lower frequencies are also removed. To compare the effect of different filters we employed a Pearson correlation coefficient between curves G and H given by $$r(x, y) = \frac{\sum (x - \bar{x})(y - \bar{y})}{\sqrt{\sum (x - \bar{x})^2 (y - \bar{y})^2}} \tag{5}$$

where $\bar{x}$ is the mean of x and $\bar{y}$ is the mean of y. See K. Pearson, "Mathematical contributions to the theory of evolution—iii. regression, heredity, and panmixia," *Philos. Transactions Royal Soc. London.* Ser. A, containing papers a mathematical or physical character pp. 253-318 (1896); see also J. Taylor, *Introduction to error analysis, the study of uncertainties in physical measurements* (University Science Books, 1997), 2nd ed., pp. 216-217. Here, r(x,y)=1 for perfect correlation.

Figure 7:
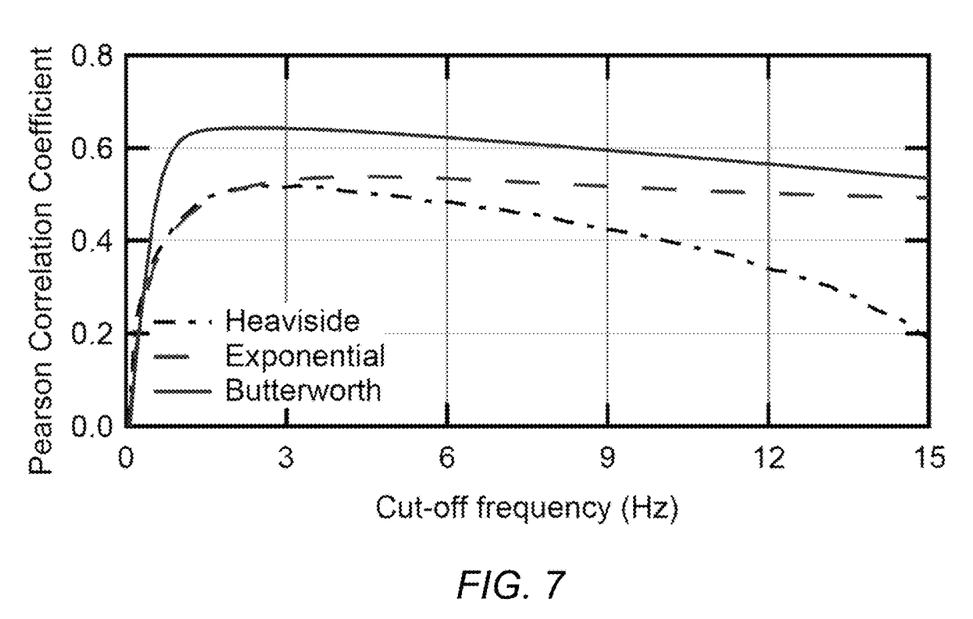
FIG. 7 is a plot of the Pearson correlation coefficient comparing bucket data without fog to bucket data with fog using Heaviside, Exponential and Butterworth filters as a function of high-pass filter cut-off frequency.

FIG. 7 shows the Pearson correlation coefficient for Heaviside, exponential and forward-backward Butterworth filters in frequency space as a function of the cut-off frequency.

The exponential filter, given by $$filt(f, f_{cut-off}, n) = 1 - \exp\left(-\left(\frac{f}{f_{cut-off}}\right)^n\right)$$

has its best result for n=2 and is only slightly better than the Heaviside filter at its peak.

Figure 8A:
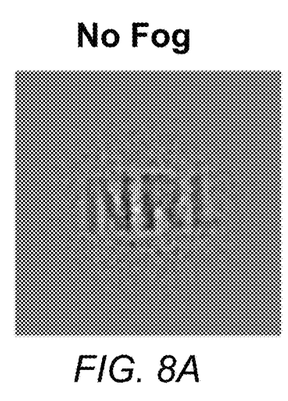
FIGS. 8A-8F are reconstructed images of a target object without fog, with fog/no filter, and high-pass filtered bucket values using the Butterworth filter and 4000 speckle patterns, where
Figure 8B:
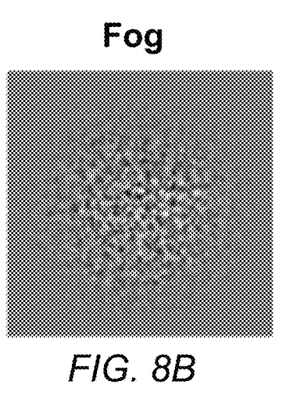
Figure 8C:
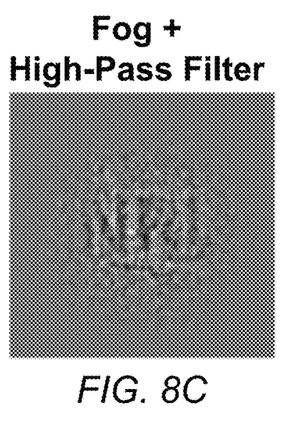
Figure 8D:
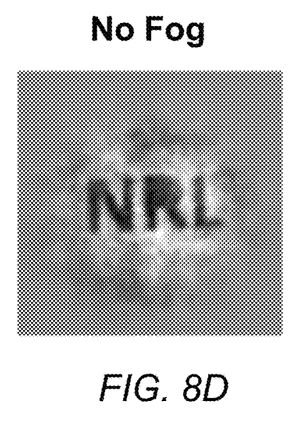
Figure 8E:
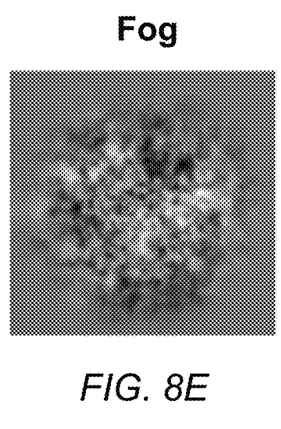
Figure 8F:
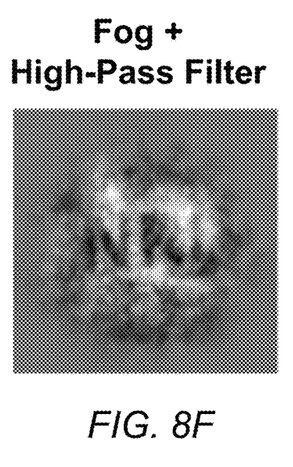

FIGS. 8A-8F are images comparing the results of CGI (FIGS. 8A-8C) and CSI (FIGS. 8D-8F) reconstructions of the target object using 4000 speckle patterns without fog (FIGS. 8A/8D), with fog (FIGS. 8B/8E), and using the Butterworth high-pass filtered bucket values with fog (FIGS. 8C/8F. Unsurprisingly, both the CGI and CSI reconstructions fail for the case with the fog bucket values without the high-pass filter. Even though fog renders reconstruction impossible without filtering, applying the high-pass filtering to the bucket values results in a successful reconstruction for both CGI and CSI, as shown by the images in FIGS. 8C and 8F. The contrast and SNR of the image reconstructed using CSI is significantly enhanced compared to the CGI method.

Advantages and New Features

The new feature of this invention is the combination of a fast single-pixel detector, the use of short pulses for time gating, a reference detector for normalizing fluctuations of the illumination intensity and a high-pass digital filter to suppress temporal fluctuations in the signal intensity due to variations in fog density. Individually, many of these techniques are known in other disciplines. For example, time gating, either by gating the detector or pulsing the source, is a known technique for suppressing return signals from near structures in range detection. Similarly, CGI and CSI with single-pixel bucket detectors have been described earlier. However, as demonstrated in our experiments (FIG. 4), application of these techniques as described in the literature without the addition of the high-pass digital filter was totally ineffective in obtaining images through fog.

Similarly, the use of a digital high-pass filter for suppressing temporal variations of background environmental illumination was described in Zhang et al., "Digital filtering ghost imaging to remove light disturbances," *Appl. Opt.* 60, 809 (2021). However, Zhang does not teach the use of a normalizing reference detector to suppress variations in the laser illumination signal during the signal acquisition time in combination with the digital filter as is used in the present invention. Nor do they speak to the advantage of the combination for suppression of temporal variations impressed on the signal itself due to fluctuations of the properties of the propagation medium.

It is the combination of these elements that enables the use of single-pixel detectors to obtain images through obscuring media such as fog that may involve naturally occurring temporal fluctuations. The single-pixel detectors are considerably less expensive than two dimensional imaging detectors. In addition, sensitive two dimensional cameras are not available at all wavelengths, especially infrared wavelengths that may be advantageous for imaging through fog.

Thus, the present invention, which uses time gating and high-pass filtering of the values of signals received by a bucket detector can enable single-pixel structured image reconstruction in a foggy environment. While the method of the present invention has been demonstrated in a laboratory environment, it is expected that fluctuations due to fog in the field environment will occur on an even longer time scale, which should allow even better image reconstruction using the method of the present invention since fewer useful bucket values will be filtered out. In addition, use of an orthogonal basis for projection, such as Hadamard patterns, can also help improve the efficacy and convergence of this technique for both CGI and CSI.

Alternatives

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein.

For example, in cases where imaging is to be done through water, the initial illumination beam can have wavelengths of 430 nm-550 nm because water has a transmission window in the blue-green spectral region. Laser repetition rates can vary from 100 Hz to 300 kHz and the cut-off frequency of the high pass filter can vary from 40 Hz to 500 Hz depending on the dynamics of the scattering medium. For a medium that fluctuates faster the repetition rate of the laser and cut-off frequency will be higher.

In some alternative embodiments, different high-pass filters such as Heaviside, Exponential or Butterworth filters or different illumination patterns, e. g., Hadamard patterns, can be used.

Figure 9:
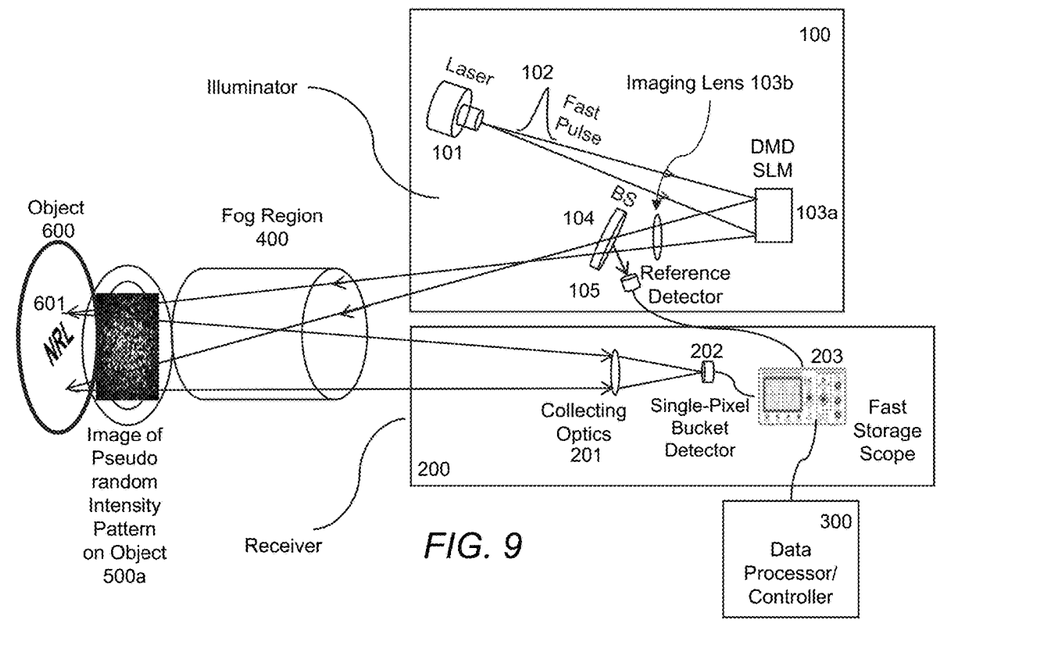
FIG. 9 is a block schematic illustrating aspects of an alternative embodiment in which the spatial light modulator (SLM) is a digital micro-mirror device (DMD) SLM that imposes pseudo-random intensity patterns on the beam that are imaged onto the target.
Figure 10:
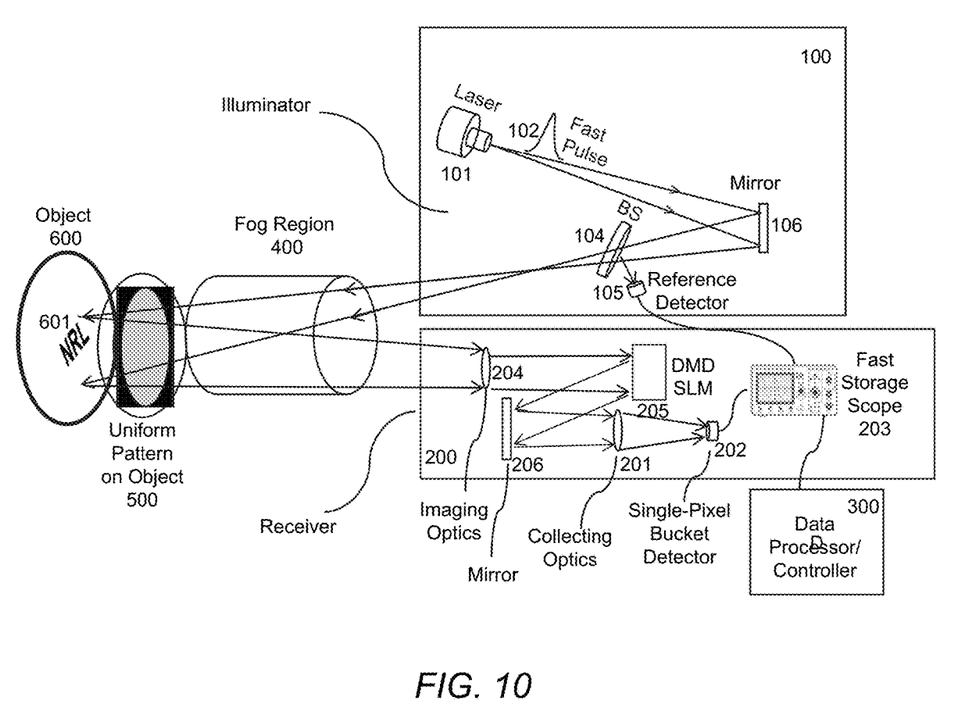
FIG. 10 is a schematic illustrating an alternative embodiment in which a uniform illumination pattern is transmitted to the object and a digital micro-mirror device (DMD) SLM is located in the receiver.

For example, in some alternative embodiments, a digital micro-mirror device (DMD) can be used as an SLM in place of a phase SLM as described above, where the DMD SLM can be implemented as part of illuminator 100 as shown in FIG. 9 or as part of the receiver 200, as shown in FIG. 10.

When arranged as part of the illuminator as shown in FIG. 9, DMD SLM 103a is used in conjunction with an imaging lens 103b. The DMD SLM 103a imposes pseudo random intensity patterns, e. g., a series of Hadamard patterns, on the illumination beam. The illumination beam with the imposed patterns are then passed through imaging lens 103b and onto the target object 601 in a manner similar to that described above with respect to FIG. 1. In addition, as described above with respect to FIG. 1, part of the illumination beam with the imposed intensity patterns is also directed into fast storage scope 203 via reference detector 105 for use by data controller/processor 300 in constructing the image of the target. The light from the illumination beam is reflected back from the target, collected by collecting optics 201, detected by bucket detector 202, and processed by data processor/controller 300 in a manner as described above with respect to FIG. 1.

When the DMD SLM is arranged as part of the receiver (FIG. 10) the illumination pulse 102 from laser 101 is transmitted directly to the target, either directly or with a mirror 106 that replaces SLM 103, to produce a uniform illumination pattern. In this embodiment, receiver 200 also contains imaging optics 204 that form an image of the target

600 at DMD SLM 205. Light from the illumination beam is reflected from target 601 and is received by imaging optics 204 and then directed into DMD SLM 205 which imposes an intensity pattern on the beam. The beam with the imposed pattern is then collected by collecting optics 201, such as a lens as described above, using optional mirror 206 if necessary to direct the beam into the optics system, and is then detected by bucket detector 202 and processed by data processor/controller 300 in a manner as described above with respect to FIG. 1.

In some embodiments, one or more of the reference detector or the bucket detector can be time-gated electronically. In other embodiments, multiple detectors for one or more of these elements can be used.

The present application contemplates these and any and all other modifications within the spirit and scope of the underlying invention described and claimed herein, and all such modifications and alternative embodiments are deemed to be within the scope and spirit of the present disclosure.

What is claimed is:

1. An apparatus for single-pixel imaging of a target to be imaged through a scattering medium, comprising:
    an illuminator comprising a pulsed laser source, a spatial light modulator (SLM), a beam splitter, and a reference detector;
    a receiver comprising collecting optics, a single-pixel bucket detector, and a fast storage scope; and
    a data processor/controller comprising a computer programmed with appropriate software including a reconstruction algorithm and having sufficient bandwidth and memory to control the apparatus and to process and analyze digital signals and reconstruct an image of the target;
    wherein the pulsed laser source emits a series of fast-pulse illumination beams directed through a scattering medium at the target;
    wherein the SLM imposes a pseudo-random pattern on each of the illumination beams, the illumination beam with imposed pattern forming a corresponding target pattern on the target when the illumination beam travels through the scattering medium and strikes the target, the imposed pattern and the corresponding target pattern being updated by the SLM at a rapid rate;
    wherein the illumination beam and corresponding target pattern reflect off the target and travel back through the scattering medium and are received by the collecting optics, the collecting optics directing the reflected beam with its corresponding target pattern into the bucket detector, the bucket detector converting the reflected beam and corresponding target pattern into an electrical signal that is directed into the fast storage scope;
    wherein the data processor/controller receives a digital signal from a reference detector that serves as a time reference for gating the signal from the target and provides a measure of the transmitted laser intensity that is used to normalize the signals reflected from the target;
    wherein the data processor/controller receives digital signals corresponding to the patterns initially applied by the SLM to the illumination beams and digital signals corresponding to the patterns in the illumination beams at the target;
    wherein the fast storage scope further receives and stores a digital signal of the time trace for each target pattern, the stored time traces being digitally gated to record a single value for each trace corresponding to a distance of the target from the storage scope and to discard signals corresponding to the scattering medium the fast storage scope storing the undiscarded signals as a time sequence of illumination beams and corresponding target patterns;
    wherein the data processor/controller normalizes the digital signal according to the transmitted laser energy for each target pattern, and applies a digital high-pass filter to remove the slower signal variations produced by dynamic changes in fog density over time; and
    wherein, using the filtered signal variations and the target patterns and using the programmed reconstruction algorithm, the data processor/controller generates an image of the target.

2. The apparatus according to claim 1, wherein the SLM is a phase SLM that applies a pseudo-random phase pattern on the illumination beam, the random phase pattern producing a corresponding speckle pattern when the illumination beam strikes the target.

3. The apparatus according to claim 1, wherein the SLM is a digital micro-mirror device (DMD) SLM that applies a pseudo-random intensity pattern on the illumination beam, the intensity pattern producing a corresponding intensity pattern when the illumination beam strikes the target.

4. The apparatus according to claim 1, wherein the SLM is situated within the illuminator and applies the pseudo-random pattern on the illumination beam before it strikes the target.

5. An apparatus for single-pixel imaging of a target to be imaged through a scattering medium, comprising:
    an illuminator comprising a pulsed laser source, a beam splitter, and a reference detector;
    a receiver comprising imaging optics, a spatial light modulator (SLM), collecting optics, a single-pixel bucket detector, and a fast storage scope; and
    a data processor/controller comprising a computer programmed with appropriate software including a reconstruction algorithm and having sufficient bandwidth and memory to control the apparatus and to process and analyze digital signals and reconstruct an image of the target;
    wherein the pulsed laser source emits a series of fast-pulse illumination beams directed through a scattering medium at the target;
    wherein the illumination beam reflects off the target and travels back through the scattering medium and is received by the imaging optics;
    wherein the imaging optics direct the reflected beam into the SLM, the SLM imposing a predefined pseudo-random intensity pattern on the reflected beam, the imposed pattern being updated by the SLM at a rapid rate;
    wherein the reflected beam with the imposed intensity pattern is then collected by the collecting optics and directed into the bucket detector, the bucket detector converting the reflected beam and imposed intensity pattern into an electrical signal that is directed into the fast storage scope;
    wherein the data processor/controller receives a digital signal from a reference detector that serves as a time reference for gating the signal from the target and provides a measure of the transmitted laser intensity that is used to normalize the signals illuminating from the target;
    wherein the data processor/controller receives digital signals corresponding to the patterns applied by the SLM to the reflected illumination beams;

wherein the fast storage scope receives and stores a time trace of the signal for each target pattern, the stored time traces being digitally gated to record a single value for each trace corresponding to a distance of the target from the storage scope and to discard signals corresponding to the scattering medium, the fast storage scope storing the undiscarded signals as a time sequence of illumination beams and corresponding intensity patterns;

wherein the data processor/controller normalizes the digital signal according to the transmitted laser energy for each pattern, and applies a digital high-pass filter to remove the slower signal variations produced by dynamic changes in fog density over time; and wherein, using the filtered signal variations and the target patterns and using the programmed reconstruction algorithm, the data processor/controller generates an image of the target.

6. A method for single-pixel imaging of a target to be imaged through a scattering medium, comprising the steps of:

generating, within an illuminator, a series of fast-pulse laser illumination beams, each of the illumination beams having a pseudo-random pattern imposed thereon by a spatial light modulator (SLM) and directing the illumination beams with the imposed pattern through a scattering medium towards the target, the illumination beam with the imposed pattern forming a corresponding target pattern on the target when the illumination beam travels through the scattering medium and strikes the target, the imposed pattern and the corresponding target pattern being updated by the SLM at a rapid rate;

receiving, at collecting optics within a receiver, a reflected illumination beam with corresponding target pattern and directing the reflected beam with its corresponding target pattern into a single-pixel bucket detector, the bucket detector converting the reflected beam and corresponding target pattern into an electrical signal and directing the electrical signal into a fast storage scope;

storing a time trace of the signal for each target pattern in the fast storage scope, the stored time traces being digitally gated to record a single value for each trace corresponding to a distance of the target from the storage scope and to discard signals corresponding to the scattering medium, the fast storage scope storing the undiscarded signals as a time sequence of illumination beams and corresponding target patterns;

receiving, at a data processor/controller coupled to the receiver, digital signals corresponding to patterns initially applied by the SLM to the illumination beams and digital signals corresponding to the target patterns in the illumination beam as reflected by the target;

receiving, at the data processor/controller, a digital signal of the time trace for each target pattern;

normalizing, at the data processor/controller, the digital signal according to the initial target pattern corresponding to the target pattern;

applying, at the data processor/controller, a digital high-pass filter to remove the slower signal variations produced by dynamic changes in fog density over time; and generating, at the data processor/controller, an image of the target using the filtered signal variations and the target patterns and a programmed reconstruction algorithm.

7. The method according to claim 6, wherein the SLM is a phase SLM that applies a random phase pattern to the illumination beam, the random phase pattern producing a corresponding speckle target pattern when the illumination beam strikes the target.

8. The method according to claim 6, wherein the SLM is a digital micro-mirror device (DMD) SLM that applies a pseudo-random intensity pattern on the illumination beam, that is imaged onto the target to produce a corresponding pseudo random intensity pattern on the target.

9. A method for single-pixel imaging of a target to be imaged through a scattering medium, comprising:

generating, within an illuminator, a series fast-pulse illumination beams directed through a scattering medium at the target;

receiving, at imaging optics within a receiver, a reflected illumination beam reflected off the target and directing the reflected illumination beam into a spatial light modulator (SLM) within the receiver, the SLM imposing a predefined pseudo-random intensity pattern on the reflected beam;

receiving, at collecting optics within the receiver, the reflected illumination beam with imposed intensity pattern and directing the reflected illumination beam with imposed intensity pattern into a single-pixel bucket detector, the bucket detector converting the reflected beam and imposed intensity pattern into an electrical signal that is directed into the fast storage scope;

receiving, at a data processor/controller coupled to the receiver, digital signals corresponding to the patterns applied by the SLM to the reflected illumination beams;

receiving and storing at the data processor/controller a time trace of the signal for each pattern in the fast storage scope, the stored time traces being digitally gated to record a single value for each trace corresponding to a distance of the target from the storage scope and to discard signals corresponding to the scattering medium, the fast storage scope storing the undiscarded signals as a time sequence of illumination beams and corresponding intensity patterns;

normalizing, at the data processor/controller, the digital signal according to the initial target pattern corresponding to the target pattern;

applying, at the data processor/controller, a digital high-pass filter to remove the slower signal variations produced by dynamic changes in fog density over time; and generating, at the data processor/controller, an image of the target using the filtered signal variations and the target patterns and a programmed reconstruction algorithm.

* * * * *